Dec. 21, 1926.

J. L. G. DYKES 1,611,162

VULCANIZING APPARATUS

Original Filed Dec. 11, 1925    3 Sheets-Sheet 1

Witness:
Chas. R. Koursh

Inventor,
John L. G. Dykes
Benj. T. Rood
Atty.

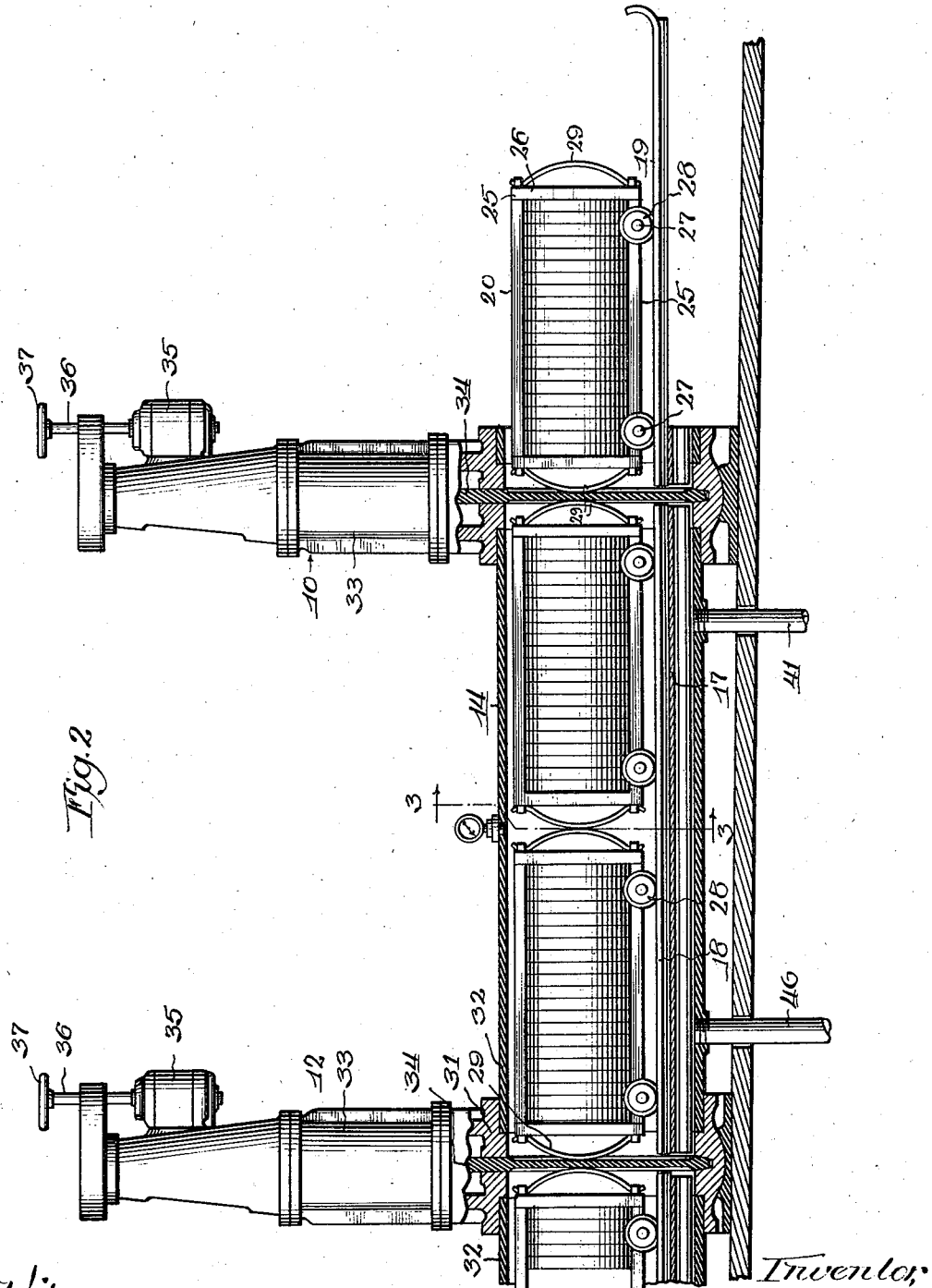

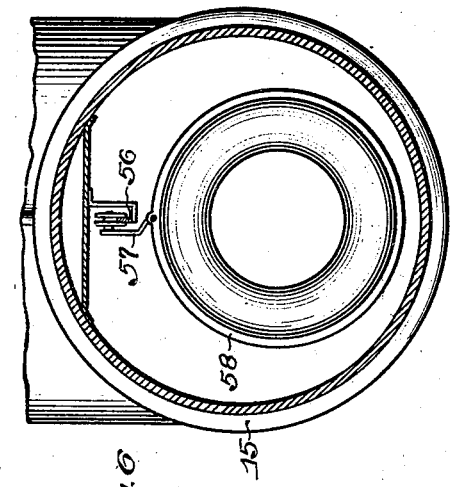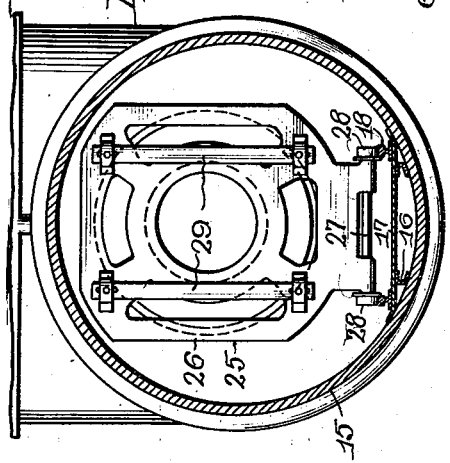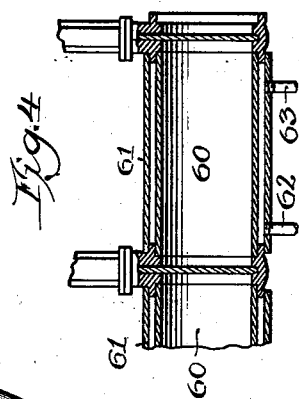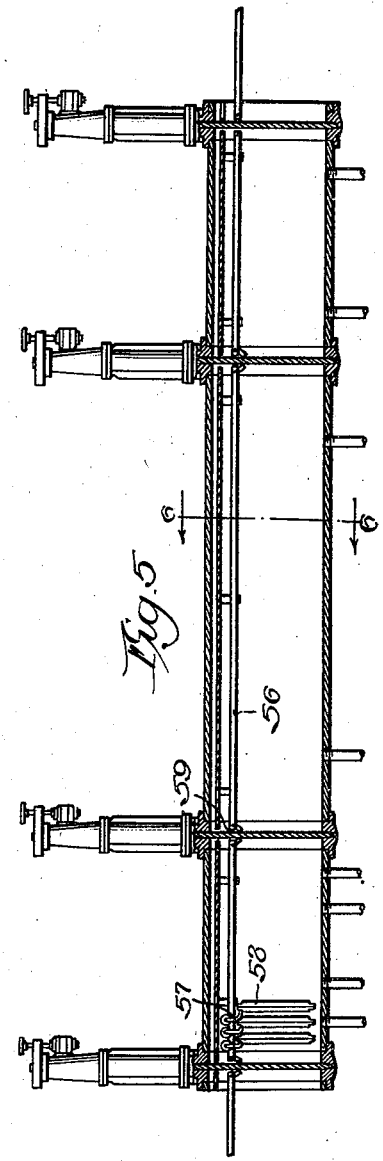

Patented Dec. 21, 1926.

1,611,162

UNITED STATES PATENT OFFICE.

JOHN L. G. DYKES, OF CHICAGO, ILLINOIS.

VULCANIZING APPARATUS.

Application filed December 11, 1925, Serial No. 74,803. Renewed May 22, 1926.

My present invention has relation to improvements in "vulcanizing apparatus," and more particularly to apparatus for vulcanizing the ordinary fabric and rubber vehicle tires. The present practice is to introduce the materials suitably fabricated for vulcanizing into a mould, then to introduce compressed air into the mould so as to compact the materials and cause them to conform to the walls of the mould. The moulds are either locked separately and then put in a vulcanizing chamber, or a number of the moulds are placed in a clamping frame in the vulcanizing chamber. The vulcanizing chamber is made so as to stand the necessary degree of steam pressure to produce the temperatures desired. After the tires in the moulds have been disposed in the vulcanizing chamber, and the desired amount of compressed air has been introduced into the moulds, and the chamber has been suitably closed, steam is first introduced up to a relatively low pressure of about fifteen pounds, and this pressure is maintained for the relatively short time of about fifteen minutes. More steam is then admitted until the pressure has reached about seventy-five pounds, and this condition is maintained for about one hour. The short low pressure stage is for tempering and gradually heating the materials and is generally referred to as tempering. The second or high pressure treatment accomplishes the major portion of the vulcanizing and curing of the tire. After the second or high pressure treatment, the steam is drawn off from the vulcanizing chamber and cold water is introduced therein for a relatively brief time. The water is then drawn off, the vulcanizing chamber opened, and the moulds and tires removed.

The above described practice is what may properly be described as a batch process, in which a certain number of moulds and tires, or a batch of them, are packed in a vulcanizing chamber, and the chamber is continuously employed while the moulds are being so packed, and during the tempering, vulcanizing and chilling steps of the process, and while the tires and moulds are being taken from the chamber before the chamber is ready for another batch. Vulcanizing chambers are expensive and their duplication in order to secure a large production is a very large expense which the tire manufacturing industry has to bear. Besides the duplication of machinery, the employment of a number of separate vulcanizing chambers involves the loss of valuable time while the chambers are being loaded and unloaded and during the tempering and chilling operations, the expense of their operation is relatively large, and a large force of operatives must be employed to keep them in operation.

It has been the object of my present invention to provide a vulcanizing apparatus with which the loading and unloading, tempering and chilling operations may be conveniently carried on without interrupting the vulcanizing and curing portion of the process. With such an apparatus I am enabled to carry on the manufacturing operations continuously without the necessity of duplicating units of the apparatus. I also effect a considerable economy of time, operating expenses and labor as my apparatus is supervised, attended and operated, with the exception of the loading and unloading operations, by a single employee.

I prefer to accomplish the foregoing object by means of the apparatus illustrated in the accompanying drawing, in which—

Fig. 2 is a central longitudinal section of the loading, or, more properly speaking, tempering section of the vulcanizing chamber, the housing of the gate valves being shown in elevation and the relation of the trackage and cars therewith illustrated;

Fig. 3 is a section on line 3—3 of Fig. 2;

Fig. 4 is a central longitudinal section, upon a smaller scale, of a fragment of a modified form of vulcanizing chamber in which the steam is admitted to a circumferential jacket instead of directly to the compartments containing the moulds and tires;

Figure 1:
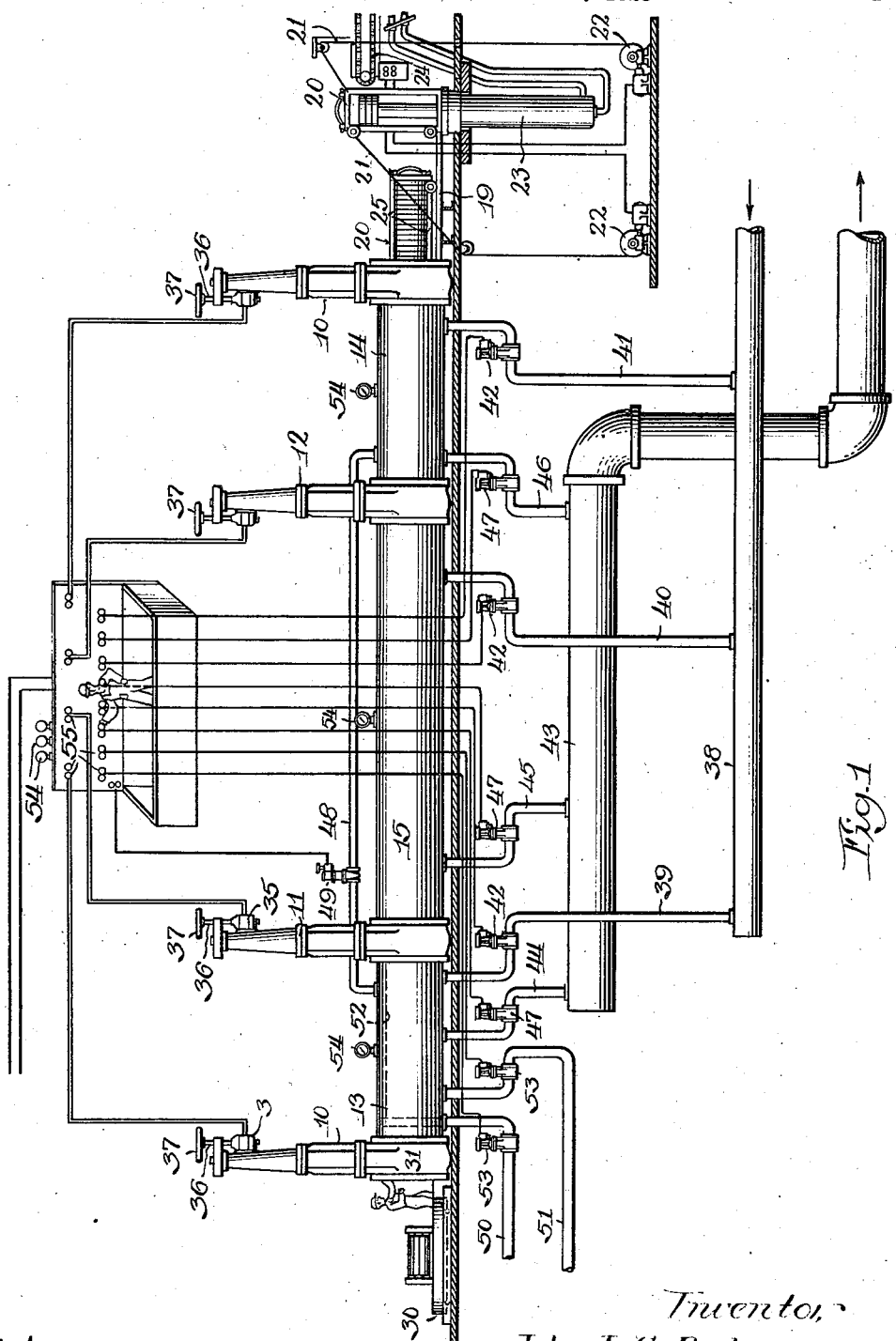
Fig. 1 is a side elevation of a vulcanizing apparatus organized in accordance with and embodying my present invention.

Fig. 5 is a central longitudinal section, also upon a smaller scale, of a vulcanizing device with loading and tempering and chilling sections, in which a single suspended rail is employed instead of the track illustrated in Fig. 2, which variety of arrangement is particularly suitable for use with moulds which lock individually instead of a number of moulds being locked in a frame provided for that purpose;

Fig. 6 is a section similar to and upon the same scale as Fig. 3 upon line 6—6 of Fig. 5.

The vulcanizing apparatus proper consists of an elongated cylindrical structure very similar to the structure of vulcanizing chambers now employed, except, that it is preferably disposed horizotally instead of vertically, and is provided with a gate valve, 10, at either end and two similar gate valves, 11, and 12 disposed mediately of the ends so as to divide the apparatus into two relatively short end sections, 13 and 14, of substantially the same length and an intermediate section, 15, of preferably substantially three times the length of one of the end sections.

The lower portions of each of these sections are provided with angles, 16, and plates, 17, to form a floor, to which floors are secured rails, 18, forming a track running longitudinally of the respective sections. The track in each section aligns with that in the other sections, and terminates only sufficiently far from the ends of the sections to permit of the closing of the gate valves between the ends of the tracks in the respective sections. The entire cylindrical structure and the tracks are preferably disposed at a slight angle to the horizontal so that trucks on the tracks, when the gate valves are opened, will run by gravity from the higher to the lower end of entire structure.

As shown in Figs. 1, 2 and 5 it is convenient and desirable to extend the trackage in the vulcanizing chamber at both ends so as to provide facilities for loading and discharging the trucks upon which the moulds and tires are mounted.

In Figs. 1 and 2 the extension of this trackage at the entrance or tempering end of the vulcanizing chamber is designated by the reference character 19 and in Fig. 1 is shown a suggested construction whereby a truck 20 may be upended at the outer end of trackage 19 through the instrumentality of a cable 21 and associated motors 22, over a hydraulic plunger or elevator device 23, which goes up through the frame of the truck to receive the tires and moulds from a conveyor 24 and which plunger is to be lowered step by step as each tire and mould is received thereon. When a sufficient number of tires and moulds to suitably fill the frame of the truck have been received, the plunger can be operated to properly assemble them in the frame of the truck for the receipt of the interior air pressure in accordance with the practice now generally known.

I have shown trucks of such size as to permit two thereof to be contained within the tempering and chilling sections of the vulcanizing chamber. One longer truck could be used, however, except I do not believe with equal convenience.

The trucks comprise generally a somewhat elongated rectangular frame consisting of longitudinal corner members 25 connected at their ends by transverse members 26. These corner and transverse members should be substantial to receive the weight of the tires and moulds and also such pressure as is necessary to hold the moulds together after the interior pressure has been applied. Journaled between adjacent longitudinal corner members and properly spaced with reference to each other and the load they are to carry, are axles 27 with wheels 28 thereon, to engage the rails 18.

Attached to the vertical transverse end members are bowed springs 29 which are designed to absorb the jar upon the stoppage of the trucks against the gate valves, and also to facilitate the entry of the gate valves between trucks as clearly illustrated in Fig. 2.

It is suggested that the trackage extended from the discharge or chilling end of the vulcanizing chamber be provided with a turntable as shown at 30 in Fig. 1, which will greatly facilitate the removal of the product after it has been vulcanized and discharged from the chilling chamber.

The gate valves heretofore mentioned are of the type now already employed for the closing of large mains for either steam or water and consist in a cylindrical portion 31 with which the walls 32 of the vulcanizing chamber assemble. From one side of this cylindrical portion 31 arises or extends a casing 33. Both the cylindrical portion 31 and the casing 33 are interiorally channeled to permit of the reciprocation of the valve plate proper 34. Valve stem and valve operating mechanism, the construction of which is well known, is housed in the casing 33, and, as shown in Figs. 1, 2 and 5, motors 35 are provided on the exterior of casings 33 for the mechanical operation of the shafts 36 on the upper ends of which are provided hand wheels 37 for the manual opening and closing of the valve.

As shown in Fig. 1 a steam supply main 38 is connected by pipe leads 39, 40 and 41 respectively with the chilling section 13, the vulcanizing section 15 and the tempering section 14 of the vulcanizing apparatus. Interposed in these pipe leads 39, 40 and 41 are electromechanically operated control valves 42. A steam exhaust main 43 is provided and this steam exhaust main is connected through similar pipe leads 44, 45 and 46 with the aforesaid respective sections. These latter pipe leads are also controlled by similar valves 47. An additional steam pipe lead 48 leading directly between chilling section 13 and tempering section 14 is provided and is controlled by a similar electromechanically operated valve 49. This latter lead, as will hereafter be more particularly described, is for the purpose of exhausting the pressure from the chilling section into the tempering section and vice versa and thereby permitting an economy of a portion of the steam used in these sections.

Additional pipe leads 50 and 51 are connected with the chilling section 13. The lead 50, being arranged with suitable piping 52 at the top of the chilling section for the introduction of a cooling fluid thereto and the pipe lead 51, is for the evacuation or discharge of the cooling fluid from the chilling section after the cooling has been accomplished. Both the leads 50 and 51 are controlled by electromechanically operated valves 53. Each of the sections 13, 14 and 15 are provided with suitable pressure indicating devices 54 and it is suggested that the circuits for operating the several valves heretofore described be brought to a central point from which the pressure indicating devices are easily visible and there provided with control switches 55 suitably labeled so that a single operative may supervise and control the operations of each essential portion of the vulcanizing apparatus thereby greatly reducing expense and conserving safety so that the separate hand operations in connection with the vulcanizing will then only relate to the loading of the trucks and the conveyance of the trucks from the machine after their discharge from the chilling section.

The operation of my device is as follows:

After a suitable number of trucks to fill the tempering section 14 have been loaded and received on the rail extension 19, gate valve 10 is opened, thereby permitting the trucks to enter tempering section 14 by gravity. Gate valve 10 is now closed and valve 42 in pipe lead 41 is opened until approximately 15 pounds of pressure of steam has been admitted to the tempering section. This condition is maintained for approximately 15 minutes. During this 15 minutes valves 42 on pipe lead 40 is operated to admit approximately 75 pounds of steam pressure into the central vulcanizing section 15. At the end of the 15 minutes valve 42 in lead 41 is again operated to raise the pressure in the tempering section 14 to 75 pounds, and upon the attainment of this pressure in the tempering section 14, gate valve 12 is opened, permitting the trucks to gravitate from section 14 to section 15. Gate valve 12 is now closed and valve 49 in pipe lead 48 is opened to permit the discharge of steam from the tempering section 14 into the chilling section 13. After the pressures in these sections are equalized valve 49 in pipe lead 48 is closed and valve 47 in pipe lead 46 is opened to completely evacuate steam from the tempering section 14 upon which gate valve 10 is again opened and additional loaded trucks gravitate therein and the foregoing operations are repeated. When the central section 15 is three times the capacity of the tempering section, the first charge of trucks have had an hour's vulcanizing at approximately the time when the third charge is tempered and ready for delivery from the tempering to the vulcanizing sections. Valve 42 in pipe lead 39 is now operated to bring the pressure in chilling section 13 up to 75 pounds and gate valve 11 is now opened to permit the gravitation of the first charge from the central section 15 into the chilling section 13. Gate valve 11 is then closed. Valve 49 in pipe lead 48 is now open to evacuate the steam from the chilling section into the tempering section and also after pressures in these sections have been equalized valve 49 is closed and valve 47 in pipe lead 44 is opened into the exhaust steam main 43 and valve 53 in pipe lead 50 is operated to introduce chilling fluid into the chilling section. This is a brief operation and when completed valve 53 in pipe lead 50 is closed and valve 53 in pipe lead 51 is opened to discharge the chilling fluid from the chilling section 13. Gate valve 10 is now opened to permit the chilled product on its trucks to gravitate on to the turntable 30.

In this way it will be seen that while the loading, tempering, chilling and discharging operations are intermittent, the vulcanizing step proper is continuous and uninterrupted and that the loading, tempering, chilling and discharging can be timed so as to keep the vulcanizing section full at substantially all times.

In Figs. 5 and 6 I have shown a form in which the trackage heretofore described in the bottom of the vulcanizing apparatus is replaced by an overhead rail 56 upon which runs a hanger 57 adapted to receive and carry a mould and tire 58. In this form of apparatus each individual mould must have locking means, but this is also a well known feature and needs no special description. In this form of apparatus the suspended or overhead rail 56 is broken at the requisite places 59 for the passage of the gate valves therebetween.

My apparatus is also capable of use where, what is called "dry vulcanizing" is practiced. "Dry vulcanizing" is where the steam is admitted to a jacket surrounding the compartment in which the vulcanizing takes place and this construction for operating in this manner is illustrated in Fig. 4 where the vulcanizing section 60 is surrounded by a jacket 61 into which the heating medium is introduced and discharged through pipe leads 62 and 63.

Having described my invention what I claim as new and desire to secure by Letters Patent is:

1. A vulcanizing apparatus comprising a compartment provided with gate valves closing the ends thereof and separating said compartment into a central and end sections, aligning tracks disposed in said sections of said compartment at an angle to the horizontal, independent means for admitting steam to said respective sections, independent means for evacuating steam from said respective sections, and means for introducing cooling fluid to and evacuating same from one of said end sections.

2. A vulcanizing apparatus comprising a compartment provided with gate valves closing the ends thereof and separating said compartment into a central and end sections, aligning tracks disposed in said sections of said compartment at an angle to the horizontal, independent means for admitting steam to said respective sections, independent means for evacuating steam from said respective sections, independent valve controlled communication between said end section, and means for introducing cooling fluid to and evacuating same from one of said end sections.

3. A vulcanizing apparatus comprising a compartment provided with gate valves closing the ends thereof and separating said compartment into a central and end sections, aligning tracks disposed in said sections of said compartment at an angle to the horizontal, independent means for admitting steam to said respective sections, independent means for evacuating steam from said respective sections, and means for introducing cooling fluid to and evacuating same from one of said end sections in combination with trucks adapted to gravitate upon said tracks.

4. A vulcanizing apparatus comprising a compartment provided with gate valves closing the ends thereof and separating said compartment into a central and end sections, aligning tracks disposed in said sections of said compartment at an angle to the horizontal, independent means for admitting steam to said respective sections, independent means for evacuating steam from said respective sections, independent valve controlled communication between said end sections and means for introducing cooling fluid to and evacuating same from one of said end sections, in combination with trucks adapted to gravitate upon said tracks.

5. A vulcanizing apparatus comprising a compartment provided with gate valves closing the ends thereof and separating said compartment into a central and end sections, aligning tracks disposed in said sections of said compartment at an angle to the horizontal, independent means for heating said respective sections and means for introducing cooling fluid to and evacuating same from one of said end sections.

6. A vulcanizing apparatus comprising a compartment provided with gate valves closing the ends thereof and separating said compartment into a central and end sections, aligning tracks disposed in said sections of said compartment at an angle to the horizontal, independent means for heating said respective sections and means for introducing cooling fluid to and evacuating same from one of said end sections in combination with trucks adapted to gravitate upon said tracks.

7. A heating or vulcanizing apparatus having, in combination, means for providing a plurality of compartments into which the articles to be treated may be introduced in succession, a gravity conveyor for the articles extending through the compartments, and means for retaining the articles on said conveyor in each compartment, said means comprising gates movable into positions to seal the compartments.

8. A heating or vulcanizing apparatus having, in combination, means providing a compartment into which the articles to be treated may be introduced, a gravity conveyor for the articles extending through the compartment, and means for retaining the articles on said conveyor in the compartment, said means comprising a gate movable into position to seal the compartment.

9. A heating or vulcanizing apparatus, having, in combination, means for providing a plurality of compartments into which the articles to be treated may be introduced in succession, a gravity conveyor for the articles extending through the compartments, and means for retaining the articles on said conveyor in each compartment.

10. A heating or vulcanizing apparatus having, in combination, means providing a compartment into which the articles to be treated may be introduced, a gravity conveyor for the articles extending through the compartment, and means for retaining the articles on said conveyor in the compartment.

11. A heating or vulcanizing apparatus having, in combination, means for providing a plurality of compartments into which the articles to be treated may be introduced in succession, a gravity conveyor for the articles extending through the compartments, and independently controlled means for supplying a fluid to each compartment for producing determinate temperature or pressure therein.

12. A heating or vulcanizing apparatus having, in combination, means for providing a plurality of compartments into which the articles to be treated may be introduced in succession, a gravity conveyor for the articles extending through the compartments, and independently controlled means for producing a determinate temperature in each compartment.

13. A heating or vulcanizing device comprising means providing a curing compartment, a tempering compartment from which articles may be delivered thereto, and a cooling compartment into which the articles may be delivered therefrom, means for conveying a stream of articles through the compartments, and means for retaining the articles in each compartment during a determinate period, said means being adapted to be so operated as to seal the curing compartment during loading and treatment of the articles in the tempering compartment and during treatment of the articles in and unloading of the same from the cooling compartment.

14. A heating or vulcanizing device comprising means providing a curing compartment, a cooling compartment into which the articles may be delivered therefrom, and means for conveying a stream of articles through the compartments, and means for retaining the articles in each compartment during a determinate period, said means being adapted to be so operated as to seal the curing compartment during treatment of the articles in and unloading of the same from the cooling compartment.

15. A heating or vulcanizing device comprising means providing a curing compartment and a tempering compartment from which articles may be delivered thereto, means for conveying a stream of articles through the compartments, and means for retaining the articles in each compartment during a determinate period, said means being adapted to be so operated as to seal the curing compartment during loading and treatment of the articles in the tempering compartment.

16. Apparatus of the class described having, in combination, means providing a compartment open at its ends, a gravity conveyor extending therethrough, and gates for sealing the ends of the compartment, one gate being adapted to retain the articles in the compartment.

17. A heating or vulcanizing device comprising means providing a curing compartment, a tempering compartment from which articles may be delivered thereto, and a cooling compartment into which the articles may be delivered therefrom, means for conveying a stream of articles through the compartments, means for retaining the articles in each compartment during a determinate period, said means being adapted to be so operated as to seal the curing compartment during loading and treatment of the articles in the tempering compartment and during treatment of the articles in and unloading of the same from the cooling compartment, means for operating the retaining and sealing means, and independently controllable means for supplying fluids to each of the compartments to produce determinate temperature and pressure conditions therein, both said operating means and said supplying means being controllable from a single remote station.

18. A heating or vulcanizing device comprising means providing a curing compartment, a tempering compartment from which articles may be delivered thereto, and a cooling compartment into which the articles may be delivered therefrom, means for conveying a stream of articles through the compartments, means for retaining the articles in each compartment during a determinate period, said means being adapted to be so operated as to seal the curing compartment during loading and treatment of the articles in the tempering compartment and during treatment of the articles in and unloading of the same from the cooling compartment, means for operating the retaining and sealing means, and independently controllable means for supplying fluids to each of the compartments to produce determinate temperature and pressure conditions therein.

19. A heating or vulcanizing device comprising means providing a curing compartment, a tempering compartment from which articles may be delivered thereto, and a cooling compartment into which the articles may be delivered therefrom, means for conveying a stream of articles through the compartments, means for retaining the articles in each compartment during a determinate period, said means being adapted to be so operated as to seal the curing compartment during loading and treatment of the articles in the tempering compartment and during treatment of the articles in and unloading of the same from the cooling compartment, means for operating the retaining and sealing means, and independently controllable means for producing determinate temperature conditions in each of said compartments, both said operating means and said supplying means being controllable from a single remote station.

20. A heating or vulcanizing device comprising means providing a curing compartment, a tempering compartment from which articles may be delivered thereto, and a cooling compartment into which the articles may be delivered therefrom, means for conveying a stream of articles through the compartments, means for retaining the articles in each compartment during a determinate period, said means being adapted to be so operated as to seal the curing compartment during loading and treatment of the articles in the tempering compartment and during treatment of the articles in and unloading of the same from the cooling compartment, means for operating the retaining and sealing means, and independently controllable means for producing determinate temperature conditions in each of said compartments.

21. Apparatus of the class described, comprising means providing a curing compartment and a compartment at each end thereof, said compartments being defined by gates movable therebetween, whereby the curing compartment may be closed while one of the second named compartments is being loaded and while the other of the second named compartments is being unloaded.

22. Apparatus of the class described, comprising means providing a curing compartment and a compartment at each end thereof, said compartments being defined by gates movable therebetween, whereby the curing compartment may be closed while one of the second named compartments is being loaded and while the other of the second named compartments is being unloaded, and means for conveying articles through the compartments adapted to deliver the articles from one compartment to the other as the gates therebetween are opened.

JOHN L. G. DYKES.